United States Patent [19]

Gillingham et al.

[11] Patent Number: 4,588,423
[45] Date of Patent: May 13, 1986

[54] ELECTROSTATIC SEPARATOR

[75] Inventors: Gary R. Gillingham, Prior Lake; James C. Rothman, Apple Valley, both of Minn.

[73] Assignee: Donaldson Company, Inc., Minneapolis, Minn.

[21] Appl. No.: 634,652

[22] Filed: Jul. 25, 1984

Related U.S. Application Data

[63] Continuation of Ser. No. 431,715, Jun. 30, 1982, abandoned.

[51] Int. Cl.⁴ .......................... B03C 3/12; B03C 3/14; B03C 3/80
[52] U.S. Cl. ........................ 55/117; 55/120; 55/127; 55/138; 55/146; 55/148; 55/431
[58] Field of Search ................ 55/117, 118, 120, 127, 55/135–138, 145, 146, 148, 150, 152, 154, 301, 348, 391, 396, 431, 435

[56] References Cited

U.S. PATENT DOCUMENTS

| | | | |
|---|---|---|---|
| 1,309,221 | 7/1919 | Schmidt | 55/118 |
| 1,372,710 | 3/1921 | McGee et al. | 55/127 |
| 1,391,436 | 9/1921 | Welch | 55/148 |
| 1,569,595 | 1/1926 | Viets | 55/148 |
| 2,283,964 | 5/1942 | Wyckoff | |
| 2,544,395 | 3/1951 | Polk | 55/348 |
| 2,712,362 | 7/1955 | Winklepleck | 55/120 |
| 2,740,493 | 4/1956 | Wintermute | 55/127 |
| 2,748,888 | 6/1956 | Hodson | 55/127 |
| 2,782,923 | 2/1957 | Cook, Jr. et al. | |
| 2,866,546 | 12/1958 | Roberts | |
| 3,362,140 | 1/1968 | Mott | 55/435 |
| 3,400,513 | 9/1968 | Boll | 55/146 |
| 3,406,669 | 10/1968 | Edwards | 55/138 |
| 3,439,476 | 4/1969 | Knight | 55/120 |
| 3,458,040 | 7/1969 | Schmid | |
| 3,458,041 | 7/1969 | Schmid | |
| 3,478,494 | 11/1969 | Lustenader | 55/127 |
| 3,492,790 | 2/1970 | Ebert | 55/127 |
| 3,853,750 | 12/1974 | Volsy | |
| 4,010,011 | 3/1977 | Reif | 55/127 |
| 4,064,548 | 12/1977 | Best et al. | 55/146 |
| 4,127,396 | 11/1978 | Tortorici et al. | 55/396 |
| 4,172,708 | 10/1979 | Wu et al. | 55/261 |
| 4,380,900 | 4/1983 | Linder et al. | 55/150 |

FOREIGN PATENT DOCUMENTS

| | | | |
|---|---|---|---|
| 806789 | 6/1951 | Fed. Rep. of Germany | 55/138 |
| 1089525 | 3/1955 | France | 55/127 |
| 413800 | 7/1934 | United Kingdom | 55/136 |

OTHER PUBLICATIONS

Bulletin No. 1200–240, "STB Strata Engine Air Systems", Donaldson Company, Inc., 1974.

*Primary Examiner*—David L. Lacey
*Attorney, Agent, or Firm*—Merchant, Gould, Smith, Edell, Welter & Schmidt

[57] ABSTRACT

An apparatus (10) for cleaning a flow of particulate-laden gas is disclosed. The apparatus (10) has a housing (11) having a gas inlet (15) and a gas outlet (16) to permit a flow of gas through the housing (11). Suspended inside the housing (11) is an electrode element (20) having a charging element (26) which defines with the housing (11) a charging chamber (31) adjacent the gas inlet (15) and having an electrostatic force element (25) which defines with the housing (11) a collecting chamber (32) adjacent the gas outlet (16). The electrode element (20) is maintained at a voltage differential from the housing (11) for charging particulate in the charging chamber (31) and subjecting charged particulate in the collecting chamber (32) to an electrostatic force, whereby charged particulate is forced outwardly toward the housing (11) and removed from the gas flow. In yet another embodiment, a helical vane structure (33) is mounted in the housing (11) at the gas inlet (15), whereby the particulate in gas is subjected to a centrifugal force and forced outwardly towards the housing (11), the centrifugal force cooperating with the electrostatic force to enable efficient removal of particulate from a flow of particulate-laden gas.

13 Claims, 17 Drawing Figures

HIGH PRESSURE GAS

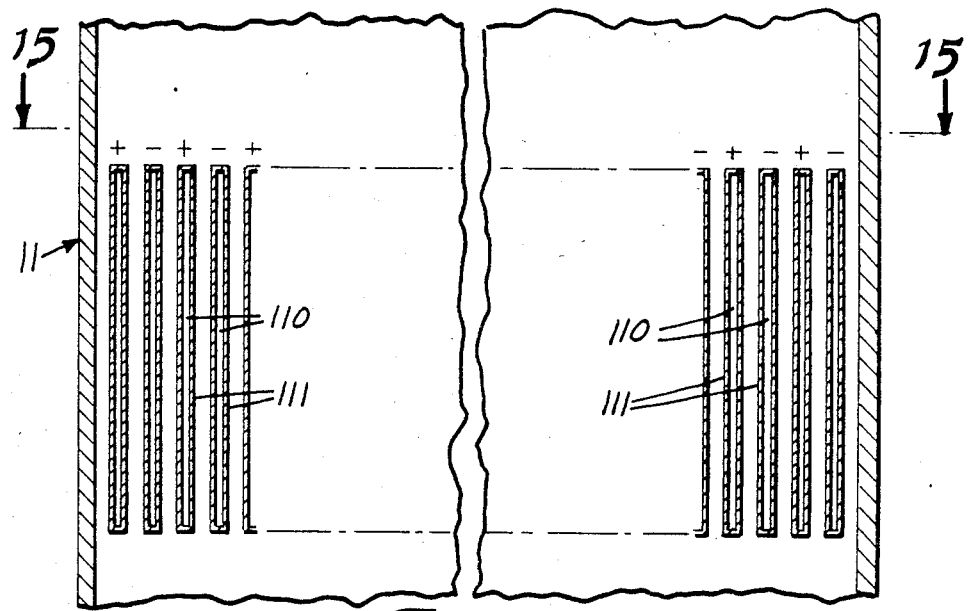
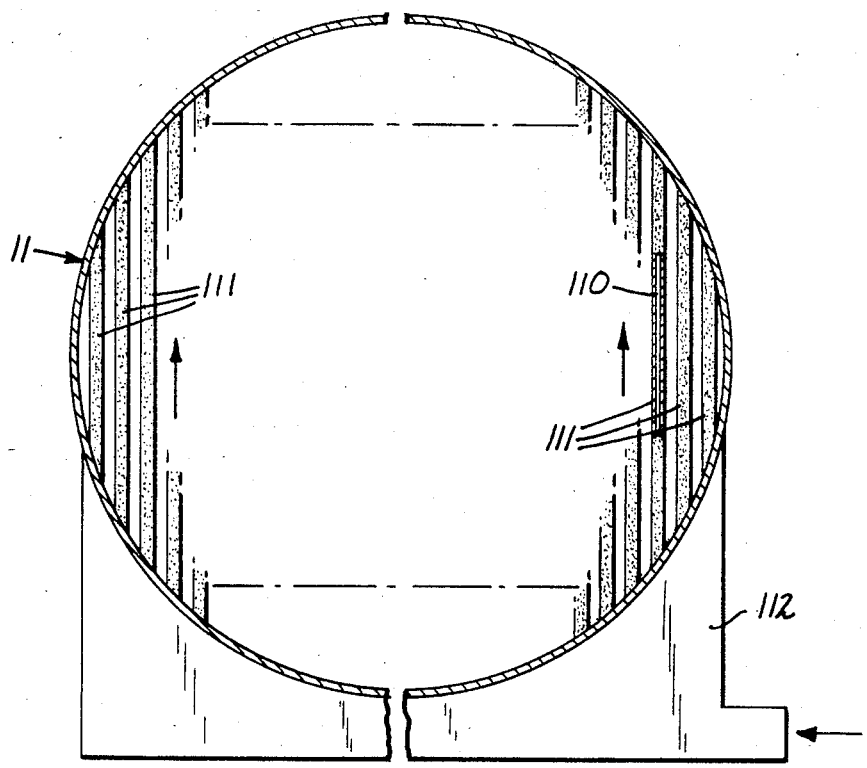

ELECTROSTATIC SEPARATOR

This is a continuation of application Ser. No. 431,715 which has been abandoned filed Sept. 30, 1982.

BACKGROUND OF THE INVENTION

The present invention relates to an apparatus for cleaning a flow of particulate-laden gas. More particularly, the present invention relates to a gas cleaning apparatus that utilizes electrostatic forces for the removal of particulate from a flow of particulate-laden gas.

There is a need for compact, lightweight, and efficient gas cleaning apparatus for cleaning a flow of gas laden with fine particulate which can be utilized in applications, such as mobile vehicles. The dangers of contaminants and pollutants in our atmosphere are well known and publicized. Significant contributors to this pollution are the mobile vehicles used for commuting, shipping, farming, mining, construction, etc. Gas cleaning apparatus are needed which will not affect the efficiency of these vehicles and yet clean up the pollutants and contaminants in the air.

Electrostatic gas cleaning apparatus have long been used for filtering out submicron particulate in gases. Examples of these devices are U.S. Pat. No. 3,853,750, which reveals an electrostatic separator utilizing parallel plates for collecting charged particulate and U.S. Pat. Nos. 3,458,040 and 3,458,041, which reveal devices utilizing electrodes to charge particles of light material and thereby aid in their removal. U.S. Pat. No. 2,866,546 reveals a combined electrostatic and magnetic separator. However, none of the above references reveals an electrostatic gas cleaning apparatus as taught by the present invention. In addition, the above references share many of the disadvantages frequently encountered with electrostatic gas cleaning apparatus.

Electrostatic gas cleaning apparatus, in order to achieve the results or efficiency desired, sometimes have to be relatively large and therefore take up much space, space which is often not available in certain applications. Often electrostatic gas cleaning apparatus have unreasonable energy demands in the form of large electrical requirements. Electrostatic gas cleaning apparatus frequently include complex cumbersome mechanisms to remove contaminants from waste collection surface areas in order to maintain efficient operation. In addition, many of the electrostatic gas cleaners are subject to electrical shorts when exposed to any gas containing electrically conductive material such as a diesel soot.

Another major consideration other than space, energy, etc., is the maintenance requirement of various gas cleaning devices. A mobile gas cleaning apparatus must be capable of efficient operation for long periods of time without maintenance and have a long mean time between failures. One of the ways to accomplish this is to build an apparatus with few mechanical parts which are not subject to wear or misadjustment.

A gas cleaning apparatus meeting the above requirements would have significant application for mobile vehicles and elsewhere. The present invention solves these problems and many others.

SUMMARY OF THE INVENTION

The present invention relates to an apparatus for cleaning a flow of particulate-laden gas. The apparatus has a housing having a gas inlet and a gas outlet to permit a flow of gas through the housing. Suspended inside the housing is separating means having a charging element adjacent to the gas inlet and a electrostatic force element adjacent to the gas outlet. The charging element defines with said housing a charging chamber and the electrostatic force element defines with said housing a collecting chamber. The gas cleaning apparatus has means for maintaining said separating means and housing at a voltage differential sufficient to charge particulate located in the charging chamber and sufficient to subject particulate located in the collecting chamber to an electrostatic force, whereby the particulate is forced outwardly towards the housing.

In a preferred embodiment of the present invention, the gas cleaning apparatus has a tubular housing of electrically conductive material. The tubular housing has a gas inlet and a gas outlet to permit a flow of gas therethrough. The tubular housing has an elongated electrode with a charging element adjacent to the gas inlet, the charging element being a single corona wire, and a electrostatic force element adjacent to the gas outlet, the electrostatic force element being an electrically conductive rod having a transverse dimension larger than the corona wire so as to inhibit formation of a corona. A dielectric rod passing transversely through the tubular housing and containing an electrical wire supports the electrode axially in the tubular housing such that the charging element of the electrode defines with the housing a charging chamber and the electrostatic force element of the electrode defines with the housing a collecting chamber. The dielectric rod is isolated from the housing by openings surrounding and separating the dielectric rod from the electrically conductive tubular housing. The openings allow for a gas flow between the dielectric rod and the tubular housing, thereby preventing a buildup of any electrically conductive particulate which might accumulate on the dielectric rod from causing an electrical short between the electrode and the housing. The dielectric rod is mechanically attached to the outside wall of the housing by an insulated connector having openings therein to allow for the passage of gas therethrough.

In yet another embodiment of the present invention, a helical vane structure is mounted in the tubular housing proximate the gas inlet for imparting to the gas a rotating flow, whereby particulate is subjected to a centrifugal force and thrown radially outwardly towards the tubular housing. The particle separator apparatus has a high voltage power supply which via the electrical wire in the dielectric rod maintains the electrode at a higher voltage than the tubular housing. The voltage differential is sufficient to cause a corona discharge at the charging element but not at the electrostatic force element, thereby charging particulate located in the charging chamber and subjecting particulate located in the collecting chamber to an electrostatic force such that particulate is forced outwardly towards and collected on an inside wall of the tubular housing.

Another feature of one preferred embodiment is a porous wall which surrounds the collecting chamber and a non-porous outer shell which surrounds but is separated from the porous wall so as to form a cavity between the porous wall and the non-porous outer shell about the periphery of the collecting chamber. The gas cleaning apparatus has a source of pressurized gas for introducing a surge of high pressure gas into the cavity and causing a radially inward flow of high pressure gas through the porous housing wall, whereby agglomerated masses of particulate which have collected on the porous wall of the housing are dislodged. The gas cleaning apparatus further has a scavenge mechanism having a generally frusto-conical structure located on the inside of the housing in the collecting chamber for separating the agglomerated masses and particulate near the periphery of the collecting chamber from the gas flow. The frusto-conical structure has its base attached to the housing and its apex axially directed toward the gas inlet. The apex of the frusto-conical structure has an opening for allowing the flow of cleaned gas through the center of the structure. There is also an outlet in the housing for removal of the particulate from the housing, the outlet being located in the collecting chamber adjacent to the base of the frusto-conical structure.

Thus, the present invention provides a gas cleaning apparatus which is ideal for mobile vehicles. The combination of the inertial forces due to the rotating flow of the gas caused by the helical vane structure and the electrostatic forces created by the electrode function together to force the particulate outwardly towards the periphery of the housing, thereby allowing the housing to be shorter than an electrostatic precipitator of the same efficiency but without the initial centrifugal augmentation.

In yet another embodiment the electrode has a corona wire and a larger diameter conductive rod, the diameter of the rod chosen to be large enough to prevent a corona from occurring down the length of the rod at the operating voltage of the gas cleaning apparatus. In this way, energy or current requirements are minimized.

Maintenance is minimal as there are few working parts. Particulate forced to the porous wall of the tubular housing is removed by the surges of high pressure gas, thereby assuring efficient operation over a long period of time, and reducing the maintenance required for periodic removal of the particulate collected on the housing.

In one embodiment, the insulating of the dielectric rod from the housing is accomplished by an aperture surrounding the rod at the housing. The flow of gas therethrough prevents a buidup of conductive material on the rod from causing an electrical path between the high voltage and low voltage components of the gas cleaning apparatus which would cause arcing and interfere with the proper functioning of the gas cleaning apparatus.

The electrostatic and centrifugal forces are complementary in that the electrostatic forces are strongest radially nearest the electrostatic force elements of the electrode, where the centrifugal forces are weakest, while the centrifugal forces are strongest radially farthest from the electrostatic force element of the electrode, where the electrostatic forces are weakest. The combined electrostatic centrifugal forces assure that particulate and agglomerates remain close enough to the inside wall of the housing to be collected by the scavenge mechanism. Should any particulate be collected on the inside wall, they are released by the inward flow of high pressure gas to be efficiently collected with the scavenge mechanism.

In addition to the above-mentioned qualities, the gas cleaning apparatus is relatively lightweight and requires few moving parts, thereby solving many of the problems present with industrial gas cleaning apparatus.

Because of its reduced size and light weight the present invention is suitable for many diverse applications such as exhaust gas treatment, dust removal at the intakes of combustion engines, industrial gas cleaning, particulate control for manufacturing processes, air filtering for furnaces, etc. The present invention has application, with few exceptions, wherever particulate removal is required.

These and other various advantages and features of novelty which characterize the present invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is described a preferred embodiment of the invention.

BRIEF DESCRIPTION OF THE DRAWINGS

FIG. 14 is a view similar to FIG. 13 of an alternate embodiment of a electrostatic force element of the present invention;

FIG. 15 is a view along line 15—15 of FIG. 14;

DETAILED DESCRIPTION OF THE PREFERRED EMBODIMENT

Figure 3:
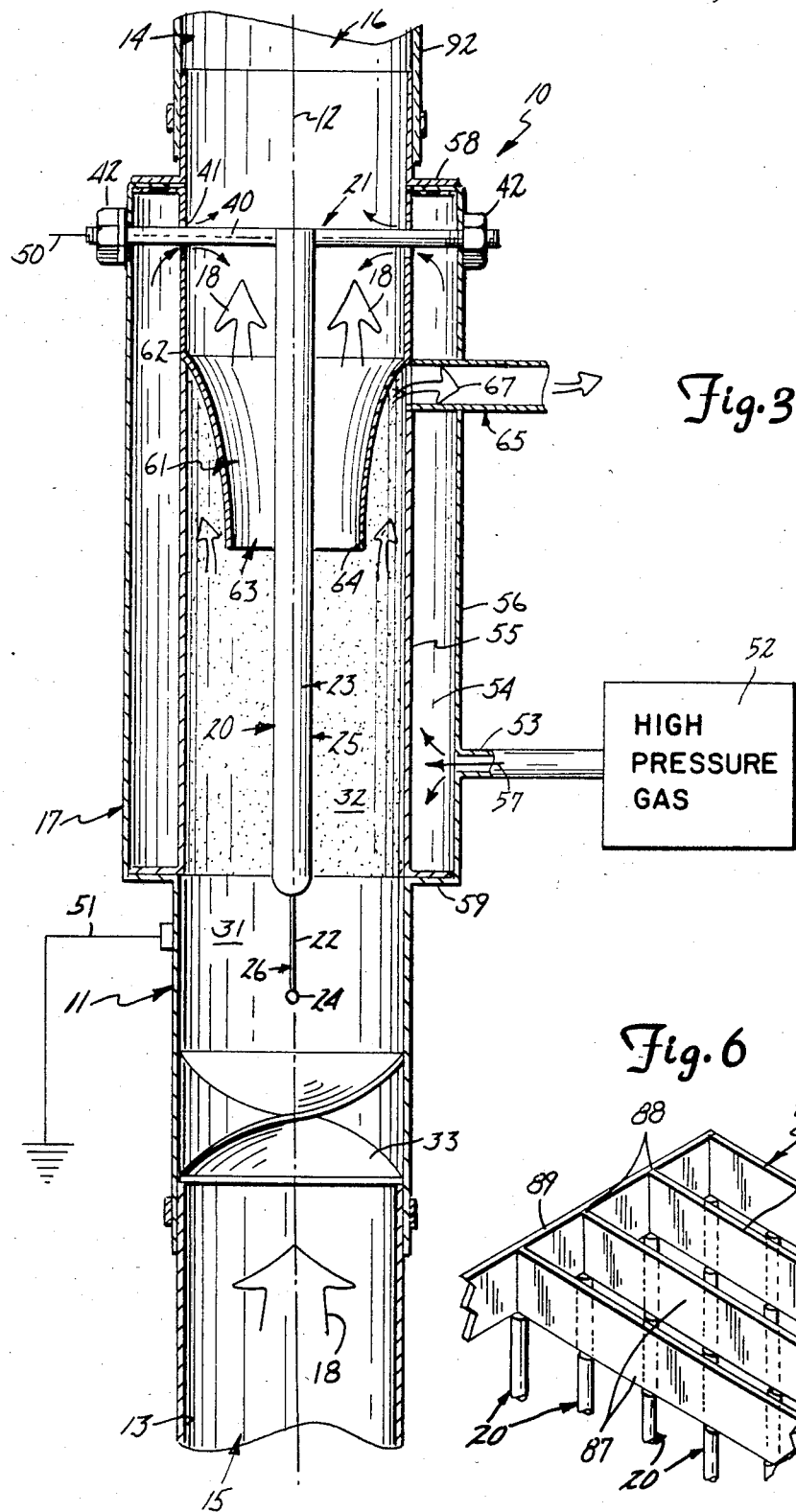
FIG. 3 is an axial cross-sectional view of a preferred embodiment of the present invention.

The drawings disclose a preferred embodiment and alternate embodiments of the present invention which is intended primarily for use with internal combustion engines and, more particularly, for use with internal combustion engines of mobile vehicles. However, it will be appreciated that the present invention may be utilized in many diverse applications. Referring to FIG. 3, gas cleaning apparatus 10 is shown as having a generally elongated tubular housing 11 having its walls 17 formed about a longitudinal axis 12 and having first and second ends 13 and 14. In normal use, the gas cleaning apparatus will be oriented so that the longitudinal axis 12 is vertical with the first end 13 at the bottom and the second end 14 at the top, as in FIG. 1; however, it is not necessary that the gas cleaning apparatus have a vertical orientation.

The ends 13 and 14 of the housing 11 are open so as to define a gas inlet 15 at the first end 13 and a gas outlet 16 at the second end 14, thereby permitting a flow of gas generally from the first end 13 to the second end 14 of the housing 11, the gas flow being generally as indicated by arrows 18 in FIG. 3. Although the housing 11 is preferably cylindrical, an oval or such similar design could also be utilized.

In the preferred embodiment, an elongated electrode 20 is suspended axially in the housing 11. The elongated electrode 20 is supported by a support structure 21 attached to the housing 11 adjacent the gas exit 16. The elongated electrode 20 includes a wire 22 attached to an electrically conductive rod 23. The rod 23 is attached to the support structure 21 proximate the center of the structure 21. The rod 23 is suspended axially in the housing 11 roughly along the longitudinal axis 12 and extends in the direction of the gas inlet 15. The wire 22 is attached to the electrically conductive rod 23 at the end of the rod 23 adjacent the gas inlet 15 and extends axially along the longitudinal axis 12 towards the gas inlet 15. The wire 22 has a small sphere 24 at its end adjacent the gas inlet 15.

The rod 23 of elongated electrode 20 forms a electrostatic force element 25 and the wire 22 of the elongated electrode 20 forms a charging element 26. A suitable power supply located externally of the housing 11 may be used to maintain the electrically conductive elongated electrode 20 and the housing 11 at a voltage differential sufficient to cause a corona discharge at the charging element 26 because of the small transverse dimension of the wire 22 but not sufficient to cause a corona discharge at the electrostatic force element 25 because of the larger transverse dimension of the electrically conductive rod 23. The sphere 24 at the end of the wire 22 conserves electrical current by reducing electrical current leakage from the end of wire 22.

The minimum voltage (V) sufficient to cause a corona discharge in the charging element 26 is derived from the following equation:

$$V = 30 \times S \times C \times (1 + .3 \times \sqrt{C/E}) \times E \times \ln(T/E)$$

where:

V = minimum voltage in kilovolts sufficient to cause a corona;
S = surface roughness factor;
C = temperature/pressure correction factor;
E = electrode radius in centimeters; and
T = tube or housing radius in centimeters.

The charging element 26 defines with the housing 11 a charging chamber 31 within the housing 11. Pollutants or other particulate in the gas are provided with an electrical charge as the gas travels through the charging chamber 31. The electrostatic force element 25 defines with the housing 11 a collecting chamber 32 within the housing 11. Charged particulate which enters the collecting chamber 32 from the charging chamber 31 is subjected to an electrostatic force created by the voltage differential between the electrostatic force element 25 and the housing 11. Since the electrostatic force element 25 is at a high voltage of the same charge as the charged particulate, the particulate is forced outwardly toward the housing 11.

In the preferred embodiment shown, adjacent to the gas inlet 15 and attached to the walls 17 of the housing 11 and located on the interior of the housing 11 is a helical vane structure 33 for imparting a rotating flow to the particulate-gases entering the gas cleaning apparatus 10 at the gas inlet 15, thereby forming a vortex. The rotating particulate is subject to a centrifugal force which causes it to move radially outwardly towards the housing 11.

The centrifugal force and the electrostatic force complement each other, thereby assuring the particulate in the gas is forced outwardly towards the walls 17 of the tubular housing 11. The electrostatic forces are strongest radially nearest the electrostatic force element 25 of the electrode 20, where the centrifugal forces are weakest, while the centrifugal forces are strongest radially farthest from the electrostatic force element 25, where the electrostatic forces are weakest. This assures that a continuous radially outward force is applied to the particulate in the gas as the gas flows through the housing 11. It will be appreciated that in other embodiments the helical vane structure need not be present. Furthermore, alternate vortex generating structures might be utilized.

The gas cleaning apparatus 10 is shown in its preferred embodiment in FIG. 3 as having a mechanism for removing from the housing 11 the particulate which is forced outwardly towards and collected on the housing 11. The mechanism includes a source 52 of a gas under pressure which introduces a surge of high pressure gas as indicated by arrows 57 via an inlet conduit 53 into a cavity 54 surrounding the collecting chamber 32. The cavity 54 is formed by a porous wall 55 surrounding the collecting chamber 32 and a non-porous outer shell 56 surrounding the porous wall 55 and connected to the porous wall 55 at top 58 and bottom 59 portions thereof so as to form the cavity 54 around the collecting chamber 32. The porous wall 55 might consist of any suitable porous material such as a sintered material or a fine mesh screen-like material. It is preferable that the porous wall 55 be made of an electrically conductive material.

The surge of compressed gas introduced into the cavity 54 causes a radially inward flow of pressurized gas through the porous housing wall 55 surrounding the collecting chamber 32. The flow of the compressed gas through the porous wall 55 dislodges agglomerated masses of particulate which had been collected on the porous wall 55 and which are consequently returned to the gas flow. The removing mechanism may be in continuous operation or may be performed on a periodic manually activated basis or as determined to be necessary. In yet other embodiments, the removing mechanism may be automatically activated on a periodic basis or as determined to be necessary by suitable sensor mechanisms. The particulate removing mechanism aids efficient operation of the present invention by preventing excessive caking or buildup of particulate in the housing 11 of the present invention.

In the preferred embodiment shown in FIG. 3, the support structure 21 suspending the elongated electrode 20 axially within the housing 11 is a dielectric rod 40 to which the elongated electrode 20 is attached near the center thereof. The dielectric rod 40 is shown as passing transversely through the housing 11 and cavity 54 adjacent the gas outlet 16. The dielectric rod 40 passes through openings 41 in the porous housing wall 55, which are larger in diameter than the dielectric rod 40, thereby defining an air space which entirely surrounds and separates the dielectric rod 40 from the porous housing wall 55. In addition to insulating the dielectric rod 40 from the housing 11, the openings 41 allow the surges of high pressure gas from source 52 to flow between the dielectric rod 40 and the porous housing wall 55, the gas flow preventing carbon particulate or other electrically conductive pollutants from depositing on and building up on the dielectric rod 40, whereby shorting between the elongated electrode 20 and the housing 11 is prevented. The dielectric rod 40 is connected to the outside of the housing 11 by fasteners 42. Note that the support structure 21 need not be electrically isolated from the housing 11 if the housing portion through which the support structure 21 passes is not electrically conductive.

Figure 2:
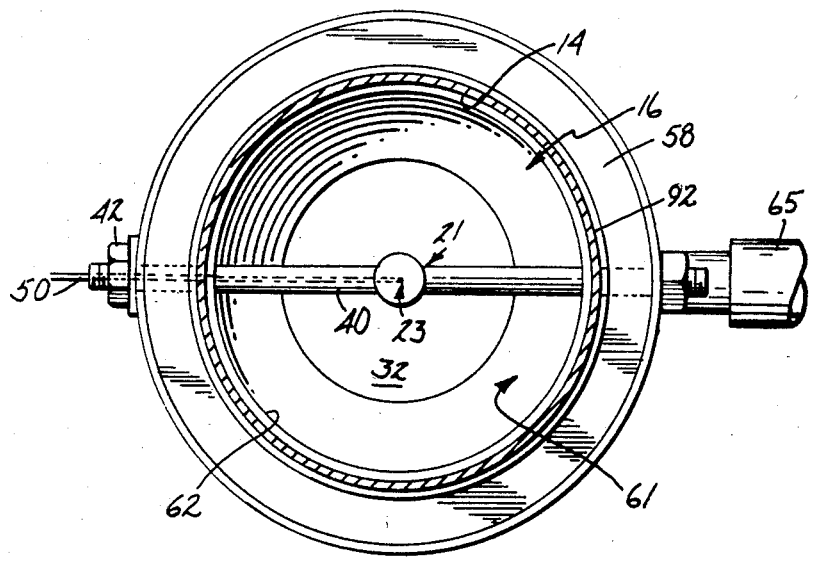
FIG. 2 is a cross-sectional top view looking down on a preferred embodiment of the present invention, taken along line 2—2 of FIG. 1.

Contained within the dielectric rod 40 is an electrical wire 50 as illustrated in FIGS. 2 and 3. The electrical wire 50 travels inside of the dielectric rod 40 and makes contact with the elongated electrode 20. The electrical wire exits from the dielectric rod 40 and leads to a power supply located externally of the housing 11. The electrical wire 50 thereby provides the electrical connection between a power supply and the elongated electrode 20 for maintaining the electrode 20 and that portion of the tubular housing 11 surrounding the collecting chamber 32 and charging chamber 31, at the required voltage differential; the housing in turn being suitably connected to ground by an electrical lead 51.

The gas cleaning apparatus 10 of the preferred embodiment includes a scavenge mechanism for separating the agglomerated masses of particulate from the gas flow and removing the agglomerated masses from the tubular housing. As shown in FIG. 3, the scavenge mechanism includes a frusto-conical structure 61 located on the inside of the housing 11 in the collecting chamber 32 adjacent the gas outlet 16. The frusto-conical structure 61 is attached about the circumference of its base 62 to the housing 11. The frusto-conical structure 61 has an apex 63 which is axially directed toward the gas inlet 15, the frusto-conical structure 61 further having an opening 64 in the apex 63 for allowing the flow of gas through the frusto-conical structure 61.

Figure 1:
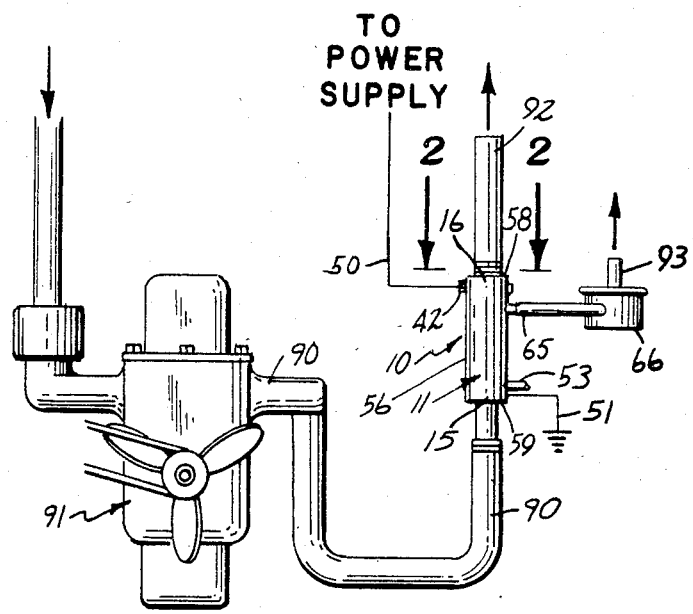
FIG. 1 is a diagrammatic view of the present invention utilized in an exhaust system.

The scavenge mechanism further includes an outlet conduit 65 in the housing 11 for removal of agglomerated masses of particulate from the housing 11. The outlet conduit 65 is located at the base 62 of the frusto-conical structure 61 in the porous wall 55 of the collecting chamber 32 and extends radially through the porous wall 55, the cavity 54, and the outer shell 56 to the outside of the housing 11. The agglomerated masses of particulate are forced out through the outlet 65 by the exhaust gas flow, indicated by arrows 67, which is generated by normal engine exhaust. The gas flow containing the agglomerated masses of particulate may be filtered further to remove the agglomerates from the gas flow by a second filtering device 66, as illustrated in FIG. 1, before the gas is released into the atmosphere. The scavenge mechanism thus aids efficient operation of the present invention by removal of agglomerated masses of particulate from the gas flow, thereby providing for the filtering of the agglomerated masses by filtering device 66 before releasing the gases into the atmosphere.

The filtering device 66 might be a conventional barrier filter apparatus having a suitable fabric filter media for filtering the agglomerated masses which are significantly larger than the discrete particulate in the gas flow through the housing 11. The barrier filter can be of a reduced size also since only a small percentage of the total gas flow is through the barrier filter. Typically, for example, only 10 percent of the total flow will be through the barrier filter apparatus. Additionally, agglomerated material causes less pressure drop across the filter media than an equivalent mass of discrete fine particulate. Also, exhaust gas is typically very hot. The high temperatures either don't allow barrier type filter apparatus to be utilized or require an expensive heat resistent media. The present invention on the other hand can be used with very high gas temperatures. Furthermore, since only a small portion of the total gas flows through the barrier filter apparatus, the gas temperatures can readily be reduced by the time the gas reaches the barrier filter media. Consequently, inexpensive media can be utilized.

Figure 7:
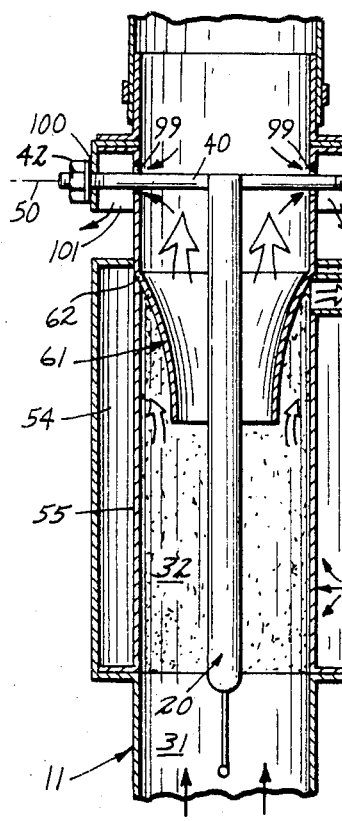
FIG. 7 is an axial cross sectional view of the present invention wherein the support structure for the electrode is positioned transversely in the housing above the cavity surrounding the electrostatic force and charging elements.

Note that the above description of gas cleaning apparatus is for a preferred embodiment as shown in FIG. 3. Numerous alternate embodiments are within the scope of the present invention. In an alternate embodiment shown in FIG. 7, the rod 40 is positioned transversely in housing 11 so as to pass through openings 99 in the housing 11 at a position above cavity 54. The rod 40 is connected to the outside of the housing 11 by support structure 100 having apertures 101 therein to allow for a flow of gas between housing 11 and rod 40. As with the preferred embodiment, the gas flow prevents an electrical short between the electrode 20 and the housing 11 which might be caused by a buildup of electrically conductive particulate on the rod 40. Support structure 100 may be any suitable structure having apertures therein to allow for a flow of gas between housing 11 and rod 40.

Figure 8:
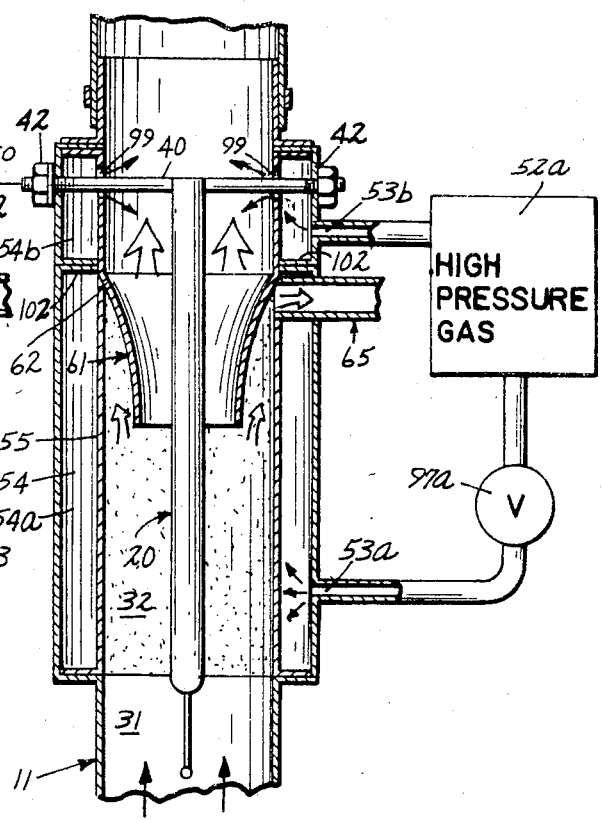
FIG. 8 is an axial cross sectional view of the present invention wherein there are two separate cavities about the periphery of the housing.

In an embodiment shown in FIG. 8, cavity 54 is separated by wall member 102 into two separate cavities 54a, b. Each cavity 54a, b, may have its own inlet 53a, b respectively for introducing pressurized gas from a high pressure gas source 52a into cavities 54a, b. Pressurized gas may be continuously introduced into cavity 54b to prevent particulate buildup on rod 40. A valve 97a may be installed between high pressure gas source 97a and cavity 54a so that high pressure gas will be introduced into cavity 54a only when valve 97a is activated and open. As with the preferred embodiment, valve 97a may be manually or automatically activated.

Figure 9:
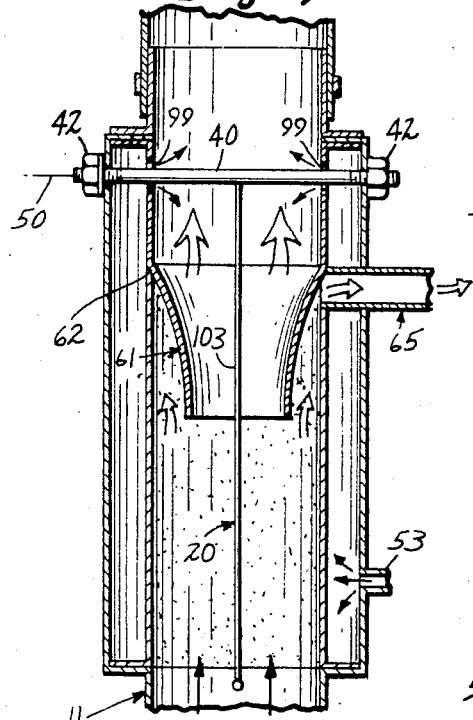
FIG. 9 is an axial cross sectional view of the present invention wherein the electrostatic force and charging elements include a single elongated wire.

In yet another embodiment shown in FIG. 9, electrode 20 includes a single elongated wire 103 suspended from rod 40 which operates both as a electrostatic force element 25 and a charging element 31.

Figure 10:
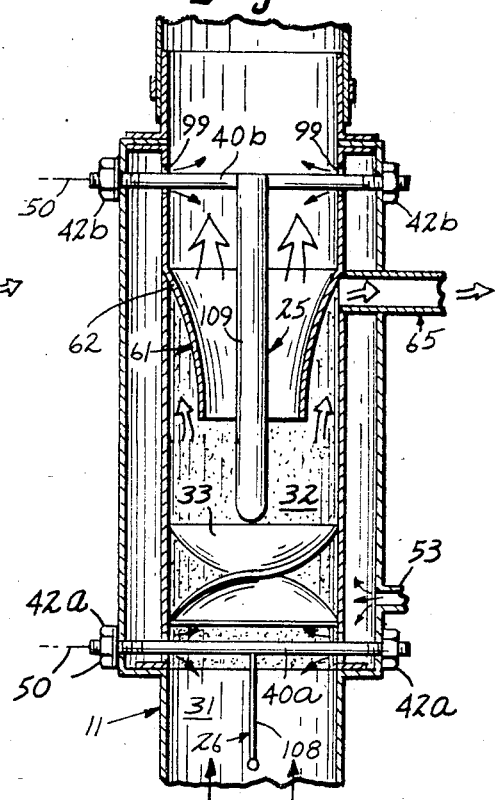
FIG. 10 is an axial cross sectional view of the present invention wherein the helical vane structure is positioned between the electrostatic force and charging elements.

FIG. 10 reveals an embodiment wherein helical vane structure 33 is positioned between charging element 26 and electrostatic force element 25. The charging element 26 includes a wire 108 suitably suspended from a rod 40a which is attached to housing 11 by fasteners 42a. Electrostatic force element 25 includes a rod-like member 109 suitably suspended from rod 40b which is suitably attached to housing 11 by fasteners 42b. Note that wire 108 and rod 109 are each suspended in housing 11 by rods 40a, b respectively in a manner similar to that of the preferred embodiment.

Figure 11:
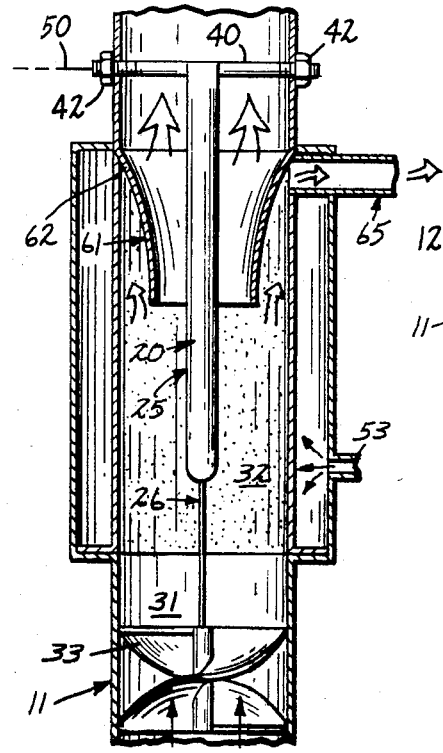
FIG. 11 is an axial cross sectional view of the present invention wherein the charging element is structurally attached to the housing and helical vane structure.

When the particulate laden gas flow contains mostly non-electrically conductive particulate there is not a problem with electrical shorting due to particulate buildup. Therefore, as shown in FIG. 11 it is possible to structurally attach electrode 20 to helical vane structure 33 or housing 11 so as to provide additional support for charging element 26. Note that any suitable structural support mechanism can be utilized. Furthermore, it is not necessary to isolate the rod 40 from the housing by air spaces since electrically conductive particulate will not buildup on rod 40.

Figure 12:
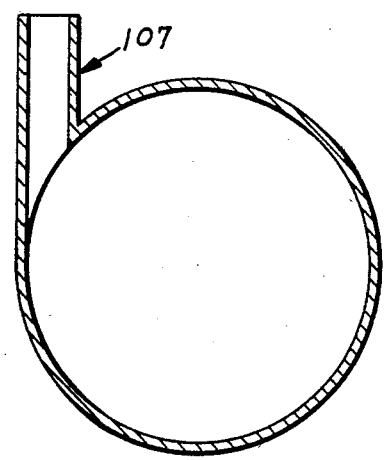
FIG. 12 is a cross-sectional view of the present invention having a tangential inlet for creation of a vortex.

FIG. 12 illustrates an alternate structure for imparting a rotating motion to the gas flow. Gas, e.g. the ambient air or exhaust gas, is introduced into the housing 11 through a tangential inlet 107. The incoming gas, is caused to rotate by the walls of the housing and correspondingly, imparts a rotational flow to the gas traveling longitudinally through the housing.

Figure 13:
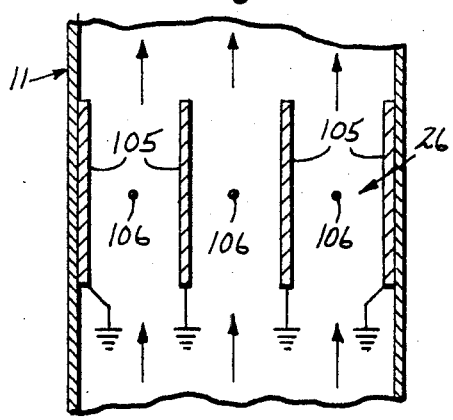
FIG. 13 is a fragmentary axial cross sectional view of the present invention having a charging element including multiple wires and plates.

FIG. 13 shows an alternate embodiment of charging element 26. In FIG. 13 the charging element 26 includes a series of parallel plates 105 with wires 106 between the plates 105. The plates 105 and wires 106 are positioned in the housing 11 transverse to the gas flow. The plates 105 are grounded and the wires 106 are suitably connected to a high voltage source, so that particulate in the exhaust gas is charged while passing between the plates 105. Note, in this embodiment, the charging element 26 is typically positioned upstream of a vortex generating structure or is utilized where the gas cleaning apparatus has no vortex generating structure.

FIGS. 14 and 15 show an alternate embodiment of the electrostatic force element 25. As illustrated, the electrostatic force element 25 includes a series of spaced parallel hollow plate-like members or tubes 110 of alternating charge which extend transversely of the housing 11. The hollow plate-like members 110 are positioned on edge so as to lie generally parallel to the gas flow. The plate-like members 110 have a relatively slight thickness compared to their width and length and include porous walls 111. Gas under pressure is forced into the interior of the plate-like members 110 through a suitable input manifold 112 such that particulate collected on the plate-like members 110 is dislodged therefrom. This embodiment will find particular application in industrial, low gas flow environments. The particulate and agglomerated masses dislodged from the porous walls 111 of the plate-like members 110 will succumb to the force of gravity thereby falling vertically downward and being collected in a suitable collection area.

Figure 16:
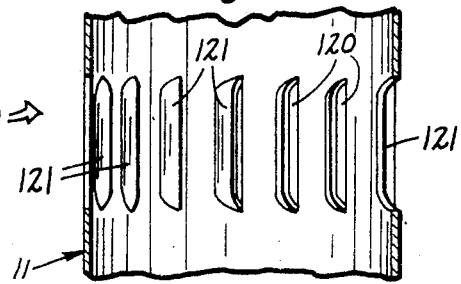
FIG. 16 is a fragmentary axial cross sectional view of the present invention having louvered inlets for creation of a vortex.
Figure 17:
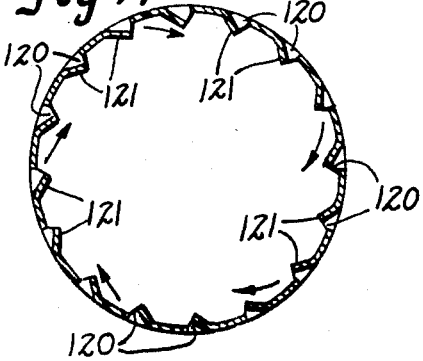
FIG. 17 is a top plan view of the louvered inlets.

Illustrated in FIGS. 16 and 17 are alternate embodiments of a structure for imparting a rotating flow to the particulate-laden gases. In FIGS. 16 and 17, multiple louvered inlets 120 are shown positioned about the periphery of the housing 11 at a location between the inlet end 15 and the electrostatic force element 25. Each inlet has a slanted fin 121 which imparts a rotational motion to the particulate-laden gas upon the entrance of gas into the housing through inlets 120.

The above are but a few of the alternate embodiments within the principles of the present invention and should by no means be construed as limiting the scope of the present invention to the embodiments shown.

Figure 4:
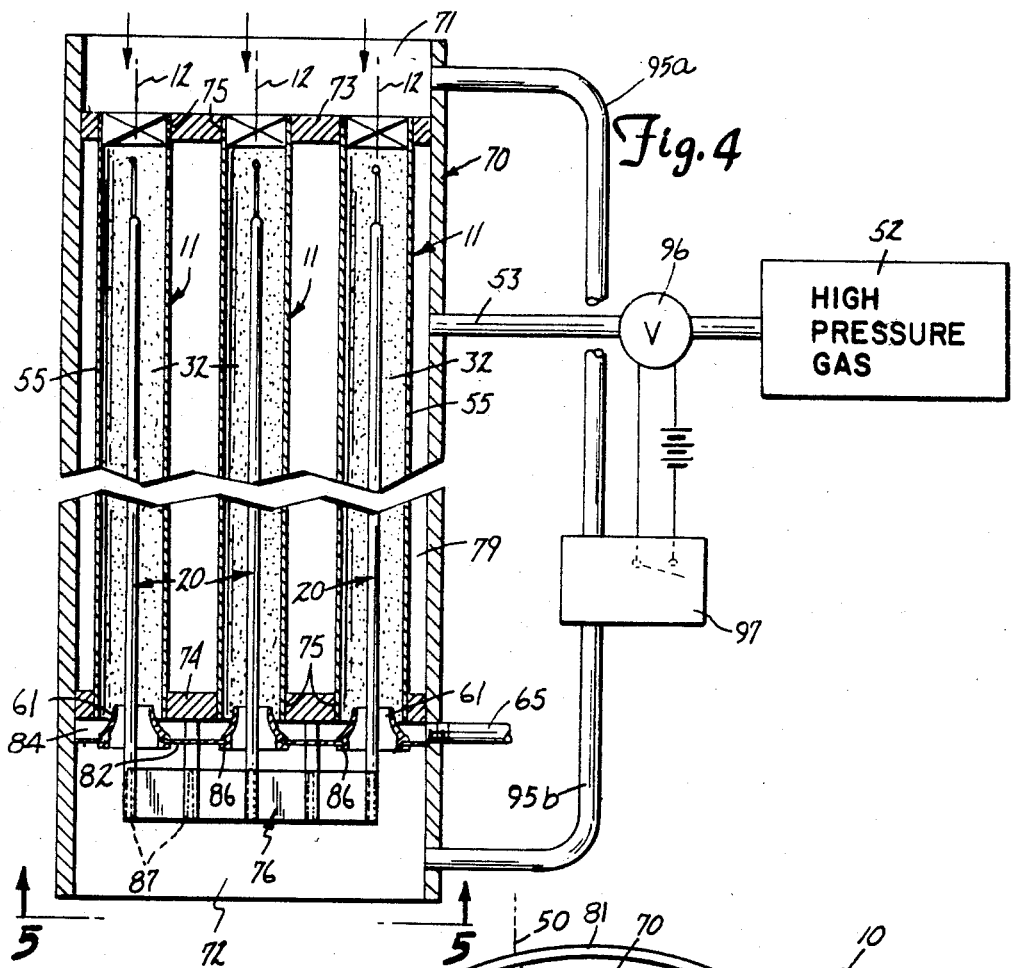
FIG. 4 is an axial cross-sectional view of a preferred embodiment of the present invention in a multiple grouping configuration.
Figure 5:
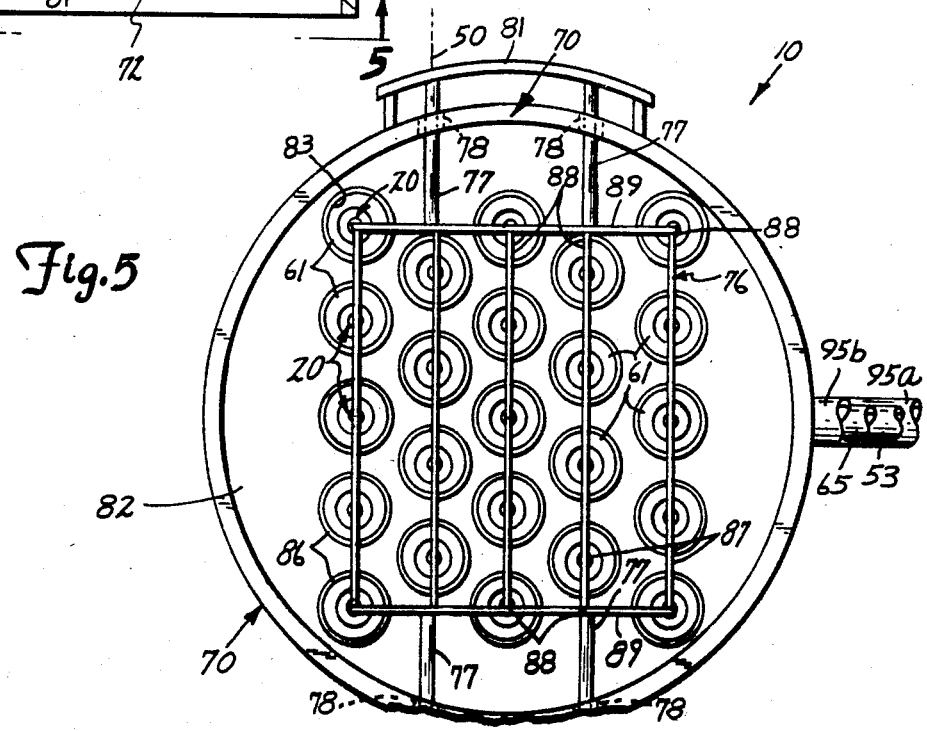
FIG. 5 is a view generally along line 5—5 of FIG. 4.

In application, an embodiment having a plurality of the gas cleaning apparatus 10 may be clustered together in a multiple configuration to provide a cleaning capability for larger volumes of gases than is provided with a solitary configuration of the present invention. As shown in FIGS. 4 and 5, a plurality of the tubular housings 11 are contained in a housing 70, the tubular housings 11 having their longitudinal axes 12 parallel to the longitudinal axis of housing 70. Housing 70 is open at both ends so as to define a gas inlet 71 and a gas outlet 72 to permit a flow of gas therethrough. The housings 11 are supported in the housing 70 by a first baffle plate 73 adjacent the gas inlet 71 and a second baffle plate 74 adjacent the gas outlet 72. The baffle plates 73 and 74 extend transversely between the walls of housing 70 and are attached about their circumferences to the housing 70. The baffle plates 73 and 74 have openings 75 therein for reception and accomodation of the tubular housings 11, thereby permitting the flow of gas through the tubular housings 11. The baffle plates 73 and 74 together with the housing 70 form a cavity 79 which surrounds the tubular housings 11. Baffle plates 73, 74 are preferably electrically conductive but need not be in all applications if alternate suitable electrical connections are provided to the individual housings 11.

Similar to the solitary configuration, in a preferred embodiment of the multiple configuration of the present invention, there is the capability to remove particulate from inside the housings 11 so as to maintain operating efficiency. This is accomplished by having a source of high-pressure gas 52 connected to the cavity 79 surrounding the tubular housings 11 in the housing 70 via an inlet conduit 53. The external source 52 introduces a surge of high pressure gas through the inlet conduit 53 into the cavity 79 surrounding the tubular housings 11, thereby causing a radially inward flow of gas through the porous walls of the housings 11 and removing any agglomerated masses of particulate which may have collected on the inside of the housings 11. In the multiple configuration, all of housing 11 or a portion thereof might be porous.

Note that in the preferred embodiment shown in FIG. 4, the introduction of high pressure gas through inlet conduit 53 is regulated by valve 96 which in turn is operated by pressure switch 97. Note that switch 97 is connected via conduits 95a, b to the gas inlet end 71 and gas outlet end 72 of housing 70. Pressure switch 97 senses the pressure differential between inlet end 71 and outlet end 72 and activates valve 96 as necessary. Valve 96 might also be manually activated or might be automatically activated on a regular periodic basis.

Figure 6:
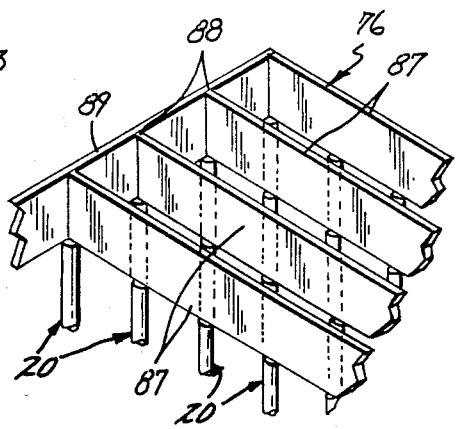
FIG. 6 is a partially enlarged perspective view of the housing grid structure which suspends the electrodes in a multiple grouping of the present invention.

In the multiple configuration, the elongated electrodes suspended in the housings 11 are supported by an electrically conductive rectangular grid structure 76, as shown in FIG. 6. The grid structure 76, as shown in FIG. 5, includes five transverse rectangular beams 87 laterally spaced, which are interconnected at their ends 88 by two beams 89 running at right angles to the beams 87. It should be noted that any suitable grid structure 76 will suffice. The grid structure 76 is located in said housing 70 between the gas outlet 72 and the second baffle plate 74 and is attached and connected to the housing 70 by a plurality of dielectric rods 77. As with the dielectric rods 40 that support the elongated electrode 20 in the housing 11 in a solitary configuration, the dielectric rods 77 pass through openings 78 in the housing 70, which are larger than the dielectric rods 77, thereby providing an air gap entirely surrounding the dielectric rods 77 and allowing flow of gas therethrough. The flow of gas through the openings 78 prevents the depositing and buildup of electrically conductive carbon particulate and the like on the dielectric rods 77, thereby preventing electrical shorting from occurring between the grid structure 76 and the housing 70. The dielectric rods are in turn connected to the exterior of the housing 70 by structure 81.

The electrical wire 50 providing the electrical connection between the power supply and the grid 76 may be inside one of the rods 77 as shown in FIG. 5 or a separate support rod may be utilized. Note that in certain applications rods 77 need not be electrically isolated from housing 70. For example, wherein the particulate laden gas has mostly non-electrically conductive particulate and wherein the housing and/or rod 77 is constructed of a non-electrically conductive material.

A third plate 82 is positioned transversely in the housing 70 adjacent to and downstream from the second baffle plate 74 but upstream of the grid structure 76. The third plate 82 has a plurality of openings 83 to accomodate the frusto-conical structures 61 and is connected about its circumference to the housing 70. The frusto-conical structures 61 are snapped into position on the plate 82 by a grooved flange 86 about the circumference of the base 62 of the frusto-conical structure 61 such that the base 62 is roughly flush with the third plate 82 and the frusto-conical structure 61 extends axially into the housings 11 roughly along the longitudinal axis 12 of each housing 11. This is different from the solitary configuration of the present invention in that the bases 62 of the frusto-conical structures 61 are attached to the third plate 82 rather than being attached to the walls of the housing 11. The third plate 82 and the second baffle plate 74 form a cavity 84 which serves as a scavenge outlet for the agglomerated masses of particulate. The cavity 84 is connected to the exterior of the housing 70 by an outlet conduit 65 extending radially through the housing 70.

As illustrated in FIG. 1, in one application the gas cleaning apparatus 10, whether it be a unitary housing 11 or a plurality of housings 11 within a housing 70, might be attached to the exhaust conduit 90 of an internal combustion engine 91. The gas outlet 16 is connected to an exhaust pipe 92 which vents the cleaned air into the atmosphere. The gas cleaning apparatus 10 is connected to a high voltage power supply. The scavenge mechanism of the gas cleaning apparatus 10 has its outlet 65 connected to a second filter 66. After filtering the exhaust gases for a second time and having removed the agglomerates the second filter 66 is shown releasing the filtered exhaust into the atmosphere via an exhaust pipe 93.

In operation, particulate-laden gases travel from the combustion engine 91 through the exhaust conduit 90 to the air inlet end 15 of the gas cleaning apparatus 10. As shown in FIG. 3, at the gas inlet end 15 the particulate-laden gas encounters and passes through a helical vane structure 33 which imparts a rotating flow to the particulate-laden gases. The rotating gases are subject to a centrifugal force and particulate is thrown radially outwardly towards the housing 11. The vortex of rotating gases then enters the charging chamber 31 of the gas cleaning apparatus 10. In the charging chamber 31, the particulate in the gas is provided with an electrical charge due to the corona discharge of the charging element 26. The vortex of rotating gases continues to move along the longitudinal axis 12 of the gas cleaning apparatus and enters the collecting chamber 32. In the collecting chamber 32, the charged particulate in the gas is subjected to an electrostatic force created by the voltage differential between the electrostatic force element 25 and the housing 11. The electrostatic force is such that the particulate is forced outwardly toward the housing 11.

As a result of the combined centrifugal and electrostatic forces, the particulate pollutants in the exhaust are separated from the gas flow and removed from the gas cleaning apparatus 10 via the outlet 65 or are collected on the porous wall 55 of the tubular housing 11. Surges of compressed gas are introduced via the inlet conduit 53 to dislodge the agglomerated masses of particulate which have collected on the porous wall 55 and which are then removed from the cleaning apparatus 10 via the outlet 65. The main gas flow, now free of pollutants and other particulate, moves past the gas outlet 16 and into the exhaust pipe 92 for venting into the atmosphere.

The afore-described invention is an efficient gas cleaning apparatus 10 with low maintenance requirements and minimal energy requirements. The problem of electrical shorting is eliminated by the present invention. Furthermore, the gas cleaning apparatus 10 has a relatively small lateral width and a relatively short longitudinal length, thereby enabling application to the exhaust system of a mobile vehicle or wherever there is limited space.

Numerous characteristics and advantages of the invention have been set forth in the foregoing description, together with details of the structure and function of the invention. The novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. An apparatus for cleaning a flow of particulate-laden gas, comprising:
   (a) a housing having a gas inlet for receiving particulate-laden gas and a gas outlet for discharging clean gas, said housing having an inner wall forming a passageway axially extending from said gas inlet to said gas outlet to permit a flow of gas therethrough;
   (b) electrode means suspended axially in said passageway of said housing, said electrode means having a charging element adjacent to said gas inlet for charging particulate in said particulate-laden gas, said charging element defining with said inner wall of said housing a charging chamber in said housing, said electrode means further having an electrostatic force element adjacent to said gas outlet for subjecting said charged particulate to an electrostatic force, said electrostatic force element defining with said inner wall of said housing a collecting chamber in said housing, said inner wall of said housing being porous proximate said collecting chamber, said housing further including a nonporous outer wall spaced from said inner wall, said inner wall and said outer wall cooperating to form an enclosed cavity surrounding said collecting chamber, said electrostatic force element being constructed and arranged to inhibit formation of a corona when said electrode means and said housing are maintained at a voltage differential sufficient to cause a corona discharge from said charging element;

(c) voltage means electrically connected to said electrode means of said housing at a voltage differential sufficient to cause a corona discharge at said charging element for charging particulate located in said charging chamber and sufficient to subject particulate located in said collecting chamber to an electrostatic force, whereby the particulate is forced outwardly towards said housing, said voltage means including an electrical wire extending from a power supply externally located of said passageway to said electrode means;

(d) support means for supporting said electrode means in said housing, said support means including a dielectric member extending into said passageway of the housing, said electrical wire traveling within said dielectric member to said electrode means, said dielectric member extending through an aperture of larger diameter than said dielectric member in said inner wall so as to be separated from said inner wall by an air space surrounding said dielectric member at its intersection with said inner wall, said electrode means being secured to said dielectric member, said dielectric member being interconnected to said housing at a location along said dielectric member outside of said passageway;

(e) vortex means within said passageway of said housing intermediate of said collecting chamber and said gas inlet for imparting a rotating motion to the gas flow, whereby particulate is forced outwardly toward said inner wall;

(f) scavenge means within said passageway of said housing for separating particulate and agglomerated masses of particulate from the gas flow, said scavenge means comprising a generally frustoconical structure located in said collecting chamber proximate the end of said collecting chamber facing said gas outlet, said frustoconical structure having a base portion attached to said housing and further having an apex portion axially directed towards the gas inlet, said frustoconical structure further having an opening in said apex for allowing a flow of gas generally through the center of said frustoconical structure, said scavenge means further including an outlet extending from said passageway in said housing proximate said base portion of said frustoconical structure to the outside of said housing, said scavenge means outlet providing a secondary gas flow out of said housing from said passageway, said scavenge means outlet being positioned on the side of said base portion facing said gas inlet, said secondary gas flow including said separated particulate and agglomerated masses of particulate; and (g) particulate removing means for removing particulate collected on the inside of said porous inner wall of said housing, said particulate removing means including means in communication with said enclosed cavity for introducing pressurized gas into said enclosed cavity surrounding said collecting chamber, whereby a radially inwardly flow of gas through said porous inner wall of said housing is caused thereby dislodging particulate and agglomerated masses of particulate from the inside of said porous inner wall of said housing.

2. An apparatus for cleaning a flow of particulate-laden gas in accordance with claim 1, wherein said inner wall of said housing includes a plurality of louvered inlets so as to form said vortex means and the gas inlet.

3. An apparatus for cleaning a flow of particular-laden gas in accordance with claim 1, wherein said vortex means comprises a helical vane-like structure positioned in said housing between said gas inlet and said electrostatic force element.

4. An apparatus in accordance with claim 1, including a secondary filtration apparatus in flow communication with said scavenge means outlet for further filtration of the particulate in said secondary gas flow.

5. An apparatus in accordance with claim 1, wherein said dielectric support member extends through said enclosed cavity, whereby pressurized gas is forced through said air space surrounding said dielectric member at its intersection with said inner wall thereby preventing the buildup of particulate on said dielectric support member.

6. An apparatus in accordance with claim 1, wherein said dielectric support member extends through a second enclosed cavity surrounding said housing and is fixedly attached to an outer wall of said second enclosed cavity, the second enclosed cavity being in communication with the particulate removing means; said dielectric member passing through an aperture in said inner wall of said housing which is of larger diameter than said dielectric support member so as to define a space through which pressurized gas introduced into said second enclosed cavity is forced into said housing, thereby preventing the buildup of particulate on said dielectric support member.

7. An apparatus for cleaning a flow of particulate-laden gas, comprising:
  (a) a housing having a gas inlet for receiving particulate-laden gas and a gas outlet for discharging clean gas in communication with each other to permit a flow of gas therethrough;
  (b) a plurality of tubular members contained in said housing, each of said tubular members having a gas inlet and gas outlet, said tubular members each having an inner wall forming a passageway axially extending from said gas inlet thereof to said gas outlet thereof to permit a flow of gas therethrough, the gas inlet of said tubular members facing said gas inlet of said housing;
  (c) first baffle means positioned within said housing and extending tranversely of said housing with openings therein to accommodate said tubular members and supporting said tubular members in said housing;
  (d) an electrode element suspended axially in each passageway of said tubular members, said electrode element having a charging element adjacent to said gas inlet of said tubular member, said charging element defining with said inner wall of said tubular member a charging chamber, said electrode element further having an electrostatic force element adjacent to said gas outlet of said tubular member, said electrostatic force element defining with said inner wall of said tubular member a collecting chamber;
  (e) means for supporting said electrode elements in said tubular members;

(f) vortex generating means mounted adjacent said gas inlets in said passageways of each of said tubular members for causing a rotating gas flow, whereby the particulate in said gas is subjected to a centrifugal force and thrown radially outwardly toward said inner walls of said tubular members;

(g) voltage means for maintaining said electrode elements and said tubular members at a voltage differential sufficient to cause corona discharge at said charging element for charging particulate located in said charging chamber and sufficient to subject particulate located in said collecting chamber to an electrostatic force, whereby the charged particulate is forced outwardly towards said inner walls of said tubular members, said voltage means including an electrical wire extending from a power supply into said housing;

(h) scavenge means within said housing for separating said particulate from the gas flow, said scavenge means including a frustoconical structure positioned at least partially within said passageway proximate the gas outlet end of each of said tubular members, each of said frustoconical structures having a base portion and an apex portion coaxially directed toward said gas inlet of its respective tubular member, said apex portion having an opening to permit the flow of gas therethrough, said scavenge means further including an outlet extending from said passageway of each of said tubular members proximate said base portion of said frustoconical structure to the outside of said housing, said scavenge means outlet being on the side of said base portion facing said gas inlet and providing a secondary flow of gas out of said housing; and (i) said support means comprising an electrically conductive grid structure attached to said electrode elements so as to maintain said electrode elements at operating voltage, said grid structure including dielectric support members extending through apertures in an inner wall of said housing enclosing said tubular members so as to provide an air space surrounding said support members at the boundary of said inner wall of said housing, said electrical wire traveling within one of said dielectric support members to said electrically conductive grid.

8. A particle separator apparatus for cleaning a flow of particulate-laden gas, comprising:

(a) a housing having first and second ends, said housing having a gas inlet for receiving particulate-laden gas at said first end and a gas outlet for discharging clean gas at said second end, said housing having an inner wall forming a passageway axially extending from said gas inlet to said gas outlet to permit a flow of gas therethrough;

(b) charging means suspended in said passageway of said housing for charging particulate in the particulate-laden gas flow, said charging means providing a corona discharge upon the application of a predetermined voltage, said charging means being positioned in said housing so as to define with said inner wall of said housing a charging chamber wherein the particulate is provided with an electrical charge;

(c) electrostatic force means suspended in said passageway of said housing at a location between said electrostatic charging means and said gas outlet, said electrostatic force means providing an electrostatic force upon application of a predetermined voltage for forcing said charged particulate in said particulate-laden gas outwardly towards said housing, said electrostatic force means defining with said inner wall of said housing a collecting chamber wherein said particulate is collected proximate the periphery of said collecting chamber, said inner wall of said housing being porous proximate said collecting chamber, said housing further including a nonporous outer wall spaced from said inner wall, said inner wall and said outer wall cooperating to form an enclosed cavity surrounding said collecting chamber;

(d) power means electrically interconnected to said charging means and said electrostatic force means for providing said predetermined voltage;

(e) vortex generating means mounted in said passageway of said housing between said gas inlet and said electrostatic force means for imparting a rotating flow to said particulate-laden gas flow, whereby particulate is subjected to a centrifugal force and thrown radially outwardly towards said inner wall of said housing;

(f) means in communication with said enclosed cavity for introducing a surge of gas under pressure into said enclosed cavity defined between said inner porous wall of said housing substantially surrounding said collecting chamber and said nonporous outer wall of said housing surrounding and separated from said porous wall of said housing, whereby a generally radially inwardly flow of pressurized gas through said inner porous wall of said housing into said collecting chamber is caused thereby disloding particulate and agglomerated masses of particulate which might have become attached on said inner porous wall; and (g) scavenge means positioned within said passageway of said housing proximate the end of said collecting chamber facing said gas outlet for separating said particulate and agglomerated masses of particulate proximate the perihpery of said housing from the gas flow, said scavenge means comprising a generally frustoconical structure located on the inside of said passageway of said housing in said collecting chamber, said frustoconical structure having a base attached to said housing and having an apex axially directed toward said gas inlet, said frustoconical structure further having an opening at said apex for allowing the flow of gas generally through the center of said frustoconical structure, said scavenge means further comprising an outlet extending from said passageway in said housing to the outside of said housing for removal of said particulate and agglomerated masses of particulate from said housing as a secondary gas flow, said scavenge means outlet being located adjacent to said base of said frustoconical structure on the side of said base facing said gas inlet.

9. A particle separator apparatus in accordance with claim 8 wherein said vortex generating means comprises a helical vane structure mounted in said housing proximate said gas inlet.

10. An apparatus for cleaning a flow of particulate-laden gas in accordance with claim 8, wherein said inner wall of said housing has a generally tubular shape and wherein said vortex generating means includes a tangential inlet in said inner wall of said housing for causing a rotating gas flow.

11. An apparatus in accordance with claim 8, wherein said charging means includes a plurality of wires and plate-like members positioned in said housing between said vortex generating means and the gas inlet.

12. An apparatus for cleaning a flow of particulate-laden gas in accordance with claim 8, wherein said vortex generating means and the gas inlet include a plurality of louvered inlets in said inner wall of said housing.

13. An apparatus for cleaning a flow of particulate-laden gas, comprising:
 (a) a housing having a gas inlet for receiving particulate-laden gas and a gas outlet for discharging clean gas, said gas inlet and said gas outlet being in communication so as to permit a flow of gas therethrough;
 (b) a plurality of tubular members contained in said housing and generally aligned longitudinally therewith, each of said tubular members having a gas inlet and a gas outlet, said tubular members each having an inner wall forming a passageway axially extending from said gas inlet to said outlet to permit a flow of gas therethrough;
 (c) first baffle means positioned within and extending transversely of said housing with openings therein to accomodate said tubular members and supporting said tubular members in said housing;
 (d) charging means suspended in each of said passageways of said tubular members for charging particulate in said particulate-laden gas flow, said charging means providing a corona discharge upon the application of a predetermined voltage, said charging means being positioned in said tubular members so as to define with said inner wall of each of said tubular members a charging chamber wherein the particulate is provided with an electrical charge;
 (e) electrostatic force means suspended in each of said passageways of said tubular members at a location between said electrostatic charging means and said gas outlet, said electrostatic force means providing an electrostatic force upon application of a predetermined voltage for forcing said charged particulate in said particulate-laden gas outwardly towards said inner wall of each of said tubular members, said electrostatic force means defining with said inner wall of each of said tubular members a collecting chamber wherein said particulate is generally collected proximate the periphery of said collecting chamber, said inner wall of said tubular members being porous proximate said collecting chamber, said inner wall of said tubular members cooperating with a nonporous inner wall of said housing spaced from said inner walls of said tubular members to form an enclosed cavity surrounding said collecting chambers of said tubular members;
 (f) power means electrically interconnected to said charging means and said electrostatic force means for providing said predetermined voltage;
 (g) vortex generating means mounted in said passageway adjacent said gas inlet of each of said tubular members for causing a rotating gas flow, whereby the particulate in said gas is subjected to centrifugal force and thrown radially outwardly toward said inner wall of each of said tubular members;
 (h) means for introducing a surge of gas under pressure into said enclosed cavity whereby a flow of gas through said porour inner walls and into said collecting chambers is caused by the introduction of gas under pressure into said cavity, thereby dislodging particulate and agglomerated masses of particulate which might have become attached to said inner walls of said tubular members; and
 (i) scavenge means positioned within said housing for separating said particulate and agglomerated masses of particulate from the gas flow so as to form a secondary gas flow, said scavenge means comprising a generally frustoconical structure located proximate the gas outlet of each of said tubular members, said frustoconical structure having a base portion interconnected to said housing and having an apex axially directed into said passageway of each of said tubular members toward the gas inlet of each of said tubular members, said frustoconical structures further having an opening at said apex for allowing the flow of gas generally through the center of said frustoconical structures, said scavenge means further including an outlet extending from said passageway of each of said tubular members to the outside of said housing for removal of said agglomerated masses of particulate from said housing in said secondary gas flow, said scavenge means outlet being located proximate the base portion of said frustoconical structure on the side of the base portion facing said gas inlet of each of said tubular members.

* * * * *

UNITED STATES PATENT AND TRADEMARK OFFICE
CERTIFICATE OF CORRECTION

PATENT NO. : 4,588,423

DATED : May 13, 1986

INVENTOR(S) : Gary R. Gillingham et al.

It is certified that error appears in the above-identified patent and that said Letters Patent is hereby corrected as shown below:

```
Column 2, line 4, change "a" to --an--.
Column 2, line 22, change "a" to --an--.
Column 1, line 21, change "etc. Gas" to --etc.. Gas--.
Column 5, line 20 should not start a new paragraph.
Column 5, line 43, change "a" to --an--.
Column 6, line 21, change "particulate-gases" to
    --particulate-laden gases--.
Column 8, line 65, change "a" to --an--.
Column 9, line 10, change "particulate laden" to
    --particulate-laden--.
Column 9, line 20, change "buildup" to --build up--.
Column 9, line 22, change "e.g." to --e.g.,--.
Column 11, lines 18 and 19, change "particulate laden" to
    --particulate-laden--.
Column 12, line 40, change "principle" to --principles--.
Column 13, lines 41 and 42, change "frustoconical" to
    --frusto-conical--.
Column 13, line 44, change "frustoconical" to --frusto-
    conical--.
Column 13, line 47, change "frustoconical" to --frusto-
    conical--.
Column 13, line 50, change "frustoconical" to --frusto-
    conical--.
Column 13, line 53, change "frustoconical" to --frusto-
    conical--.
Column 15, line 20, change "frustoconical" to --frusto-
    conical--.
Column 15, line 23, change "frustoconical" to --frusto-
    conical--.
Column 15, line 30, change "frustoconical" to --frusto-
    conical--.
Column 16, line 33, change "disloding" to --dislodging--.
Column 16, line 40, change "perihpery" to --periphery--.
```

UNITED STATES PATENT AND TRADEMARK OFFICE
CERTIFICATE OF CORRECTION

PATENT NO. : 4,588,423

DATED : May 13, 1986

INVENTOR(S) : Gary R. Gillingham et al.

It is certified that error appears in the above-identified patent and that said Letters Patent is hereby corrected as shown below:

```
Column 16, line 42, change "frustoconical" to --frusto-
    conical--.
Column 16, line 44, change "frustoconical" to --frusto-
    conical--.
Column 16, line 47, change "frustoconical" to --frusto-
    conical--.
Column 16, line 49, change "frustoconical" to --frusto-
    conical--.
Column 16, line 56, change "frustoconical" to --frusto-
    conical--.
Column 18, line 19, change "porour" to --porous--.
Column 18, line 29, change "frustoconical" to --frusto-
    conical--.
Column 18, line 31, change "frustoconical" to --frusto-
    conical--.
Column 18, lines 35 and 36, change "frustoconical" to
    --frusto-conical--.
Column 18, line 38, change "frustoconical" to --frusto-
    conical--.
Column 18, line 45, change "frustoconical" to --frusto-
    conical--.
```

UNITED STATES PATENT AND TRADEMARK OFFICE
CERTIFICATE OF CORRECTION

PATENT NO. : 4,588,423

DATED : May 13, 1986

INVENTOR(S) : Gary R. Gillingham et al

It is certified that error appears in the above-identified patent and that said Letters Patent is hereby corrected as shown below:

Column 1, lines 4 and 5, change "Ser. No. 431,715 which has been abandoned filed Sept. 30, 1982" to -- Ser. No. 431,715 filed Sept. 30, 1982, which has been abandoned --.

Signed and Sealed this

Eleventh Day of November, 1986

Attest:

DONALD J. QUIGG

Attesting Officer      Commissioner of Patents and Trademarks